United States Patent [19]

Kitabayashi et al.

[11] Patent Number: 4,878,886
[45] Date of Patent: Nov. 7, 1989

[54] TOOTHED BELT AND POWER TRANSMISSION DEVICE USING THE SAME

[75] Inventors: Masayuki Kitabayashi; Michio Tanaka, both of Kobe, Japan

[73] Assignee: Bando Chemical Industries, Ltd., Kobe, Japan

[21] Appl. No.: 299,688

[22] Filed: Jan. 23, 1989

[51] Int. Cl.⁴ .............................................. F16G 1/00
[52] U.S. Cl. .................................. 474/204; 474/153; 474/205
[58] Field of Search ........................... 474/203–205, 474/152–153, 148

[56] References Cited

U.S. PATENT DOCUMENTS

| | | | |
|---|---|---|---|
| 2,507,852 | 5/1950 | Case | 474/148 |
| 2,934,967 | 5/1960 | Worrall, Jr. | 474/148 |
| 2,937,538 | 5/1960 | Worrall, Jr. | 474/148 |
| 3,002,396 | 10/1961 | Worrall, Jr. | 474/148 |
| 3,173,301 | 3/1965 | Miller | 474/154 |
| 3,260,125 | 7/1966 | Dolza | 474/148 |
| 3,404,576 | 10/1968 | Cicognani et al. | 474/148 |
| 3,756,091 | 9/1973 | Miller | 474/153 |
| 3,924,481 | 12/1975 | Gregg | 474/153 |
| 3,969,946 | 7/1976 | Gregg | 474/153 |
| 3,977,265 | 8/1976 | Worley et al. | 474/153 |
| 4,007,644 | 2/1977 | Weinberger | 474/148 |
| 4,016,772 | 4/1977 | Clemens et al. | 474/156 |
| 4,037,485 | 7/1977 | Hoback | 474/148 |
| 4,041,789 | 8/1977 | Hoback | 474/148 |
| 4,108,011 | 8/1978 | Gregg | 474/205 X |
| 4,147,069 | 4/1979 | Derner | 474/205 |
| 4,148,225 | 4/1979 | Redmond, Jr. et al. | 474/148 |
| 4,233,852 | 11/1980 | Bruns | 474/153 |
| 4,337,056 | 6/1982 | Bruns | 474/153 X |
| 4,403,979 | 9/1983 | Wujick | 474/153 |
| 4,515,577 | 5/1985 | Cathey et al. | 474/204 |
| 4,696,665 | 9/1987 | Macchiarulo et al. | 474/205 X |
| 4,775,357 | 10/1988 | Wolfe | 474/205 |

FOREIGN PATENT DOCUMENTS

| | | |
|---|---|---|
| 2412762 | 7/1979 | France . |
| 1312164 | 4/1973 | United Kingdom . |
| 2084688 | 4/1982 | United Kingdom . |
| 2085999 | 5/1982 | United Kingdom . |
| 2109503 | 6/1983 | United Kingdom . |

Primary Examiner—Thuy M. Bui
Attorney, Agent, or Firm—Wenderoth, Lind & Ponack

[57] ABSTRACT

In a toothed belt, each tooth of the belt in longitudinal cross-section has a tooth top part composed of a pair of tooth top portions and a tooth tip portions formed in circular arcs, respectively, whose radius dimensions and location of centers are predetermined by a set of equations and inequalities so that a first contact point of the belt tooth with a pulley groove approaches to a tooth center line. In a power transmission device using the abovedescribed toothed belt and a toothed pulley, a shape of each pulley groove of the pulley is predetermined by a set of equations and inequalities so that a compressive force applied to the belt tooth during engagement concentrates to the tooth center line.

8 Claims, 8 Drawing Sheets

Fig.15
Prior Art

TOOTHED BELT AND POWER TRANSMISSION DEVICE USING THE SAME

TECHNICAL FIELD TO WHICH THE INVENTION BELONGS

This invention relates to a toothed belt (synchronous belt) and also relates to a power transmission device composed of a combination of the toothed belt and toothed pulleys (synchronous pulleys) engaging therewith, and more particularly relates to improvements for lengthening a life of the toothed belt and for decreasing a noise when the belt and the pulleys are in mesh.

RELATED BACKGROUND ART

Figure 12:
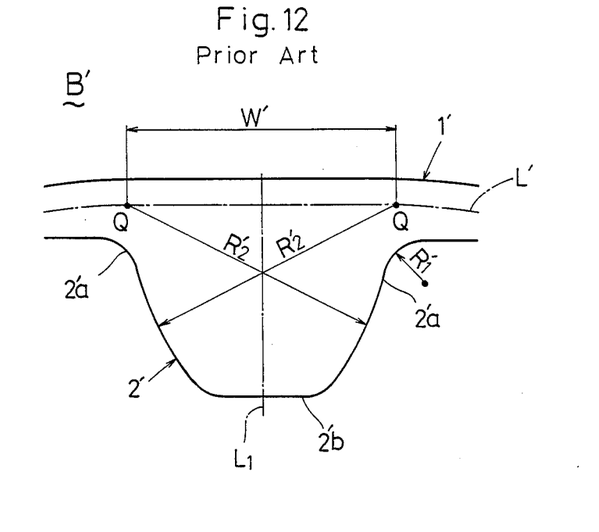
FIG. 12 is a fragmentary longitudinal side view of a conventional type toothed belt.
Figure 13:
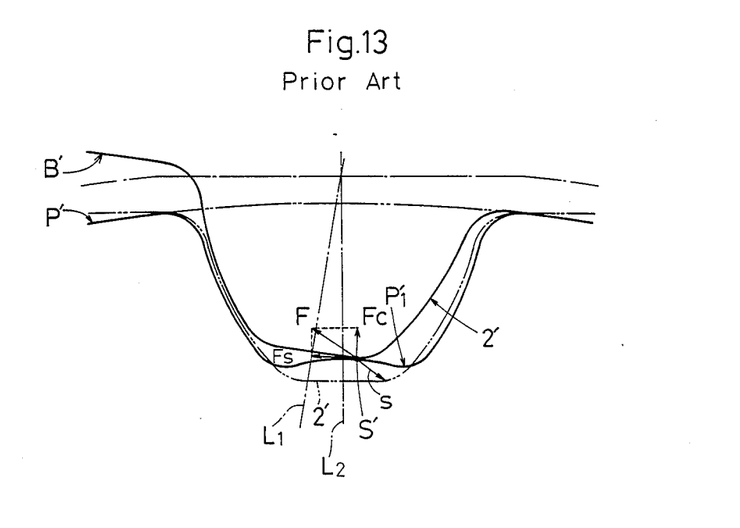
FIG. 13 is a framentary longitudinal side view of a conventional pulley and belt when the first contact occurs.

Conventionally, in a kind of a toothed belt, for example, there is a well known compressive engagement type belt disclosed in U.S. Pat. No. 4,108,011 issued Aug. 22, 1978. As shown in FIG. 12, a belt B' is provided with a belt body 1' made of elastomer material reinforced with at least one high elastic tensile member (not shown) which extends along a belt pitch line L' and defines the belt pitch line L'. Along an inner periphery of the belt body, there are formed a plurality of synchronous belt teeth 2' at a certain pitch and each belt tooth has a width W' at tooth root smaller than the pitch. A flank part of each belt tooth 2' is formed in a circular arc with a radius $R'_2$ equal to the width W' at tooth root, centers of the flank part 2' being on intersectioins Q and Q between the belt pitch line L' and imaginarily extended arcs of an outline of the belt tooth 2'. During engagement of the belt B' with the pulley P', as shown in FIG. 13, each belt tooth 2' meshes with a pulley groove $P'_1$ of the pulley P' under a compressed and deformed condition. In the figure reference $R_1$ means a radius dimension of a circular arc at a tooth root part 2'a of the belt tooth 2'.

Each tooth top part 2'b is compressed and deformed during engagment since the flank part of the belt tooth 2' of the belt B' is formed in a circular arc and a tooth height dimension of the belt tooth 2' is larger than a depth dimension of the pulley groove $P'_1$. Therefore, the belt tooth 2' is protected from a formation of cracks at the tooth root part 2'a and the increase of the wear at the tooth top part 2'b, and also the vibration and a noise are reduced. Namely, the since the resistivity against the shearing force at the tooth root 2'a of the belt tooth 2' increases due to the compressive force Fc applied at the belt tooth 2' during engagement, therefore, the same effect can be obtained as when using a high shearing strength member, and durability of the belt tooth 2' is improved.

In the abovedescribed conventional belt B' the tooth top part 2'b is usually flat-shaped. However, in that case, it is confirmed that there is a disadvantage due to intereference between the belt tooth 2' of the belt B' and the pulley groove $P'_1$ during engagement. As a result of our study and the repeated experiments, it is cleared there are problems as described below and the further improvement are required to increase durability of the toothed belt and to lower the noise when the belt and the pulley are in mesh.

When the belt B' engages with the pulley P', as shown in FIG. 13, a first contact point S' at which the belt 2' first contacts with the pulley groove $P'_1$ is on the tooth top part 2'b. However, in case the tooth top 2'b is flat-shaped, the first contact point S' is apart from the center line $L_2$ of the pulley groove $P'_1$. Therefore, with respect to a component of the force F applied to the tooth top part 2'b on the belt during the period ranging from the first contact between the tooth top part 2'b on the belt B' and the pulley groove $P'_1$ to the entire engagement therebetween, the shearing component Fs applied to the tooth top part 2'b is large, and the compressive componeont Fc applied thereto is small and deviated from a center line $L_1$ of the belt tooth 2' causing the stress concentration. For this reason, the belt tooth 2' is severly fatigued and its durability is lowered.

Also, since the first contact point S' is apart from the center line $L_1$ of the belt tooth 2', an angle of rotation of the puley is large during the period ranging from the first contact between the tooth top part 2'b on the belt B' and the pulley groove $P'_1$ to the entire engagement therebetween to increase the slip quantity. Therefore, the fatigue of the belt tooth 2' increases and the noise also increases.

Figure 14:
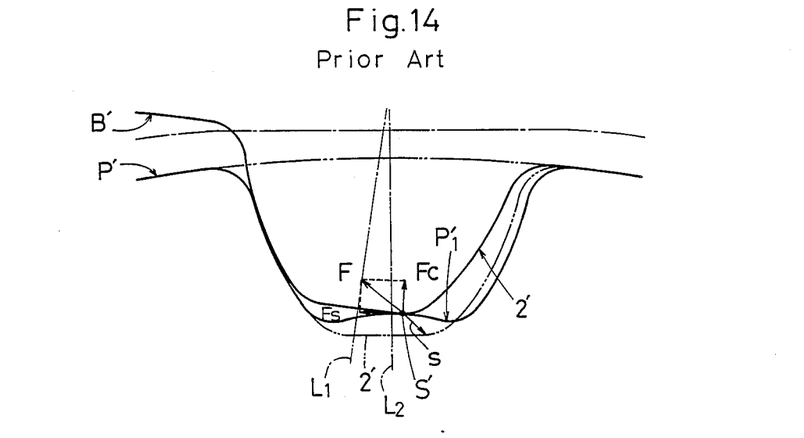
FIG. 14 is a fragmentary longitudinal side view of the conventional pulley and belt when the first contact occurs in case plus pitch errors exist.
Figure 15:
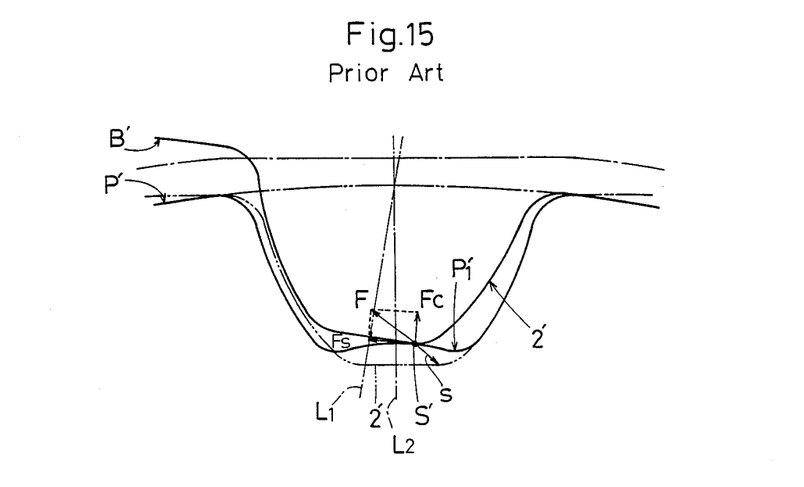
FIG. 15 is a fragmentary longitudinal side view of the conventional pulley and belt when the first contact occurs in case minus pitch errors exist.

Especially, as shown in FIG. 13, in case a bottom part of the pulley groove $P'_1$ of the toothed pulley P' is formed in a convex circular arc whose center lies on the center line $L_2$ of the pulley groove $P'_1$ in an opposite side of the pulley pitch line, namely, in the same side as the pulley center, the compressive force during engagement of the belt tooth 2' with the pulley groove $P'_1$ is deviated from the belt tooth center line $L_1$ causing the stress concentration toward the tooth root. Therefore, the belt ltooth 2' is easily chipped. Also, when plus switch errors exist in the engagement, as shown in FIG. 14, or minus pitch errors exist therein, as shown in FIG. 15, causing the slip out of position of the exact engagement between the belt tooth 2' and the pulley groove $P'_1$, a movement of the belt tooth 2' increases causing the large noise since the direction in which the compressive force applies largely deviates from the belt tooth center line.

The principal object of this invention is therefore to improve durability of the belt and to provide the toothed belt which can lower a noise level during engagement of the belt with the pulley by improving a shape of the belt tooth of the toothed belt, particularly, a shape of the tooth top part.

Another object of this invention is to provide a power transmission device composed of said toothed belt and a toothed puley, particularly to provide a preferable toothed pulley adapted for engaging with the toothed belt.

SUMMARY OF THE INVENTION

In order to attain abovedescribed objects, in this invention, the shape of the belt toothed, particularly the shape of the tooth top is predetermined so that the first contact point of the belt tooth with the pulley groove approaches to the pulley groove center line and the belt tooth center line.

Moreover, in this invention, the shape of the pulley groove of the toothed pulley adapted for engaging with the toothed belt is predetermined so that the direction in which the compressive force applies to the belt is towaard the belt tooth center line during engagement even when the pitch errors exist.

Concretely, the toothed belt in this invention has an endless belt body made of elastomer material, tensile members embedded in the belt body extending longitudinally thereof along a belt pitch line, and a plurality of belt teeth integrally formed with the belt body along an inner periphery thereof with a certain pitch Pb for engaging with a toothed pulley in pulley grooves thereon. The belt teeth are separated by belt cavity portions. Each belt tooth is symmetrical about a belt tooth center line in longitudinal cross-section and each belt cavity portion is symmetrical about a belt cavity portion center line in longitudinal cross-section. Each belt tooth is divided into four regions in longitudinal corss-section from a tooth root to a tooth tip, composed of a pair of opposed tooth root portions occupying a first region, a pair of convex arcuate tooth flank portions which extend from ends of the tooth root portions toward the tooth tip occupying a second region, a pair of convex arcuate tooth top portions which extend from ends of the tooth flank portions toward the tooth tip occupying a third region, and a tooth tip portion which connects ends of the tooth top portions occupying a fourth region. All portions are connected so as to be formed in a continuous curvature. Each belt tooth has a width Wb at tooth root measured between intersections Q and Q at which the belt pitch line intersects imaginarily extended arcs of the tooth flank portions from conjunctive points thereof with the tooth root portions in longitudinal cross-section, wherein the width Wb at tooth root is predetermined to be in a range of 0.3–0.8 times as long as the belt tooth pitch Pb.

Each tooth portion of the belt tooth is formed in a first circular arc with a radius $R_1 b$ connecting the tooth flank portion to a base part of the belt cavity portion in both sides of the belt tooth center line, wherein the base part is a line coinciding with a belt land line which is colinear with base parts of other belt cavity portions on the belt. Each belt tooth has a tooth height Hb measured between an extremity of the tooth tip portion and the belt land line at the belt tooth center line, wherein the tooth height Hb is higher than a groove depth demension of the pulley groove. Each tooth flank portion is formed in a second circular arc with a radius $R_2 b$ equal to the width Wb at tooth root, a center of which lies on the intersection Q between the belt pitch line and the imaginarily extended arc of the opposite tooth flank portion from the belt tooth center line. The tooth tip portion is formed in a fourth circular arc whose center lies on the belt tooth center line and whose radius $R_4 b$ is predetermined to be in a range given by following inequality.

$$R_4 b > \{(Wb/2)^2 + Kb^2 - (R_2 b)^2\}/4(Kb - R_2 b) \quad (1)$$

(Wherein reference Kb is a distance measured between the extremity of the tooth tip portion of the belt tooth and the belt pitch line.) Each tooth top portion is formed in a third circular arc whose center lies on a point (x, y) apart from the tooth center line in the same side as the tooth top portions. The location of the point (x, y) is expressed by following equations in an x-y coordinate system which is composed of an origin on an intersection between the belt pitch line and the belt tooth center line, x axis extending along the belt pitch line in a direction toward the tooth top portions in question from the tooth center line and y axis extending along the belt tooth center line in a direction toward the tooth top portions from the belt pitch line.

$$x = -(Wb/2) + (R_2 b - R_3 b)\cos\theta \quad (2)$$

$$y = (R_2 b - R_3 b)\sin\theta \quad (3)$$

Wherein $$\theta = \sin^{-1}\{4 T_A/(R_2 b - R_3 b) \cdot Wb\} \quad (4)$$

$$T_A = \{T_S \cdot (T_S - R_2 b + R_3 b) \cdot (T_S - R_4 b + R_3 b) \cdot (T_S - Wb/2)\}^{\frac{1}{2}} \quad (5)$$

$$T_S = (R_2 b + R_4 b - 2R_3 b + Wb/2)/2 \quad (6)$$

and whose radius $R_3 b$ is predetermined to be in a range given by following inequalities.

$$R_3 b > \{(Wb/2)^2 + Kb^2 - (R_2 b)^2\}/4 (Kb - R_2 b) \quad (7)$$

$$R_3 b < \{(Wb/2)^2 + Kb^2 - (R_2 b)^2\}/2(Kb - R_2 b) \quad (8)$$

The tooth height Hb of the belt tooth is preferably determined to be in a range of 1.01–1.20 times as high as the depth dimension of the pulley groove.

Also, a power transmission device of claim 3 is composed of a combination of the toothed belt and toothed pulleys engaging therewith, wherein each toothed pulley has a plurality of pulley grooves formed along an outer periphery of the pulley at a certain pitch Pp in which the belt teeth of the toothed belt engages under a compresed condition. The pulley grooves are separated by pulley teeth. Each pulley groove is symmetrical about a pulley groove center line which passes through the center of the pulley in longitudinal cross-section and each pulley tooth is symmetrical about a pulley tooth center line which passes through the center of the pulley in longitudinal cross-section. The pulley groove is substantially composed of a pair of circular arcs centers of which lie on the pulley pitch line.

Moreover, the pulley in the power transmission device of claim 5 is based on a pulley having a plurality of pulley grooves formed along an outer periphery of the pulley at a certain pitch Pp in which the belt teeth of the toothed belt engage under a compressed condition, wherein the pulley grooves are separated by pulley teeth, each pulley groove is symmetrial about the pulley groove center line which passes through the center of the pulley in longitudinal cross-section and each pulley tooth is symmetrical about the pulley tooth center line which passes through the center of the pulley in longitudinal cross-section, and comprises a belowmentioned arrangement. Namely, each pulley groove is divided into four regions in longitudinal cross-section from a tooth root to a groove bottom and is composed of a pair of convex arcuate tooth root portions which continue to the pulley tooth occupying a first region, a pair of concave arcuate groove flank portions which extend from ends of the tooth root portions toward the groove bottom occupying a second region, a pair of concave arcuate groove bottom portions which extend from ends of the groove flank portions toward the groove bottom occupying a third region and a groove innermost portion which connects ends of the groove bottom portions occupying a fourth region. All these portions are connected so as to be formed in a continuous curvature. Each pulley groove has a groove width Wp measured between intersections R and R at which the pulley pitch line intersects imaginarily extended arcs of the pulley flank portions from conjunctive points thereof with the tooth root portion in longitudinal cross-section, wherein the groove width Wp is predetermined to a sum of the width Wb at tooth root of the belt tooth and a backlash quantity C therewith. Each tooth root portion of the pulley groove is formed in a first circular arc with a radius $R_1 p$ connecting the groove flank portion to an outermost part of the pulley tooth in both sides of the pulley groove center line, wherein the outermost part is a line coinciding with an outside diameter of the pulley a center of which lies on a pulley center in longitudinal cross-section. Each groove flank portion is formed in a second circular arc with a radius $R_2 b$ equal to the pulley groove width Wp a center of which lies on the intersection R between the pulley pitch line and the imaginarily extended arc of the opposite groove flank portion from the pulley groove center line. The groove innermost portion is formed in a fourth circular arac and whose center lies on the pulley groove center line and whose radius $R_4 p$ given by following inquality with respect to the radius of $R_4 b$ the tooth tip portion of the belt tooth, $$R_4 p \geq R_4 b$$

and each pulley groove has a groove height Hp measured on the pulley center line from an intersection between the outer periphery line and the pulley to an extremity of the inermost portion. Each groove botom portion is formed in a third circular arc whose center lies on a point (x, y) apart from the pulley groove center line in the same side as the groove bottom portions, wherein a location of the point (x, y) is expressed by following equaions in an x-y coordinate system which is composed of an origin on an intersection between the pulley pitch line and the pulley groove center line, x axis extending along the pulley pitch line in a direction toward the groove bottom portions in question from the pulley groove center line and y axis extending along the pulley groove center line in an outward direction.

$$x = -2A_2 \cdot B_2 \cdot \{2(1 + A_2^2)\}^{-1} + \quad (9)$$
$$[4A_2^2 \cdot B_2^2 - 4(1 + A_2^2) \cdot$$
$$\{B_2^2 - (R_3 p - R_4 p)^2\}]^{\frac{1}{2}} \cdot$$
$$\{2(1 + A_2^2)\}^{-1}$$

$$y = x \cdot A_2 + B_2 - Hp + R_4 p - ap \quad (10)$$

Wherein $$A_2 = -A_1/B_1 \quad (11)$$

$$B_2 = \{-A_1^2 - (R_3 p - R_4 p)^2 - \quad (12)$$
$$B_1^2 + (R_2 p - R_3 p)^2\}/$$
$$(-2B_1)$$

$$A_1 = -Wp/2 \quad (13)$$

$$B_1 = \{Od^2 - (Wp/2)^2\}^{\frac{1}{2}} - Od + Hp - R_4 p + ap \quad (14)$$

$$Od = Pp \cdot N/(2\pi) \quad (15)$$

(reference ap is a differential quantity of the pulley pitch line of the pulley, reference N is numbers of the pulley teeth)

And whose radius $R_3 p$ is predetermined to be in a range given by following inequalities.

$$R_3 p > \{(Wp/2)^2 + Kp^2 - (R_2 p)^2\}/4(Kp - R_2 p) \quad (16)$$

$$R_3 p < \{(Wp/2)^2 + Kp^2 - (R_2 p)^2\}/2(Kp - R_2 p) \quad (17)$$

(wherein reference Kp is a distance dimension measured between the extremity of the innermost portion of the pulley groove and the pulley pitch line.)

In this case, a relation between the belt tooth and pulley groove is preferably predetermined to satisfy a following equation and inequaliteis as in claim 7.

$$Hb/Hp = 1.01 \sim 1.10$$

$$R_4 b \leq R_4 p$$

$$R_3 b > R_3 p$$

According to the abovedescribed arrangement, the first contact point at which the belt tooth of the toothed belt first contacts with the pulley groove part of the toothed pulley approaches to the belt tooth center line and the pulley groove center line when the toothed belt engages with the toothed pulley. Therefore, the fatigue of the toothed belt decreases when the first contact point lies nearly on the pulley groove center line since the shearing force applied to the belt tooth top portions decreases, and the compressive force applied thereto increases and concentrates in the direction toward the belt tooth center line during the period ranging from this first contact to the entire engagement under a compressed condition.

Moreover, the fatigue of the belt tooth and the noise may further decrease since an angle of rotation from the first contact between the belt tooth and the pulley groove to the entire engagement therebetween becomes smaller and a slip quantity decreases according to the approach of the first contact point to the belt tooth center line.

For this reason, in the power transmission device in which the toothed belt is adapted for the toothed pulley, it is possible to improve durability of the belt and to decrease a noise level during engagement.

Further, in the toothed pulley of the transmission device where the shape of the groove bottom portion is predetermined in accordance with the abovedescribed equations or inequalities from (9) to (17), since the centers of the pulley groove bottom portion and the groove innermost portion on the pulley are located in the same side as the pulley pitch line, the compressive force applied to the belt concentrates in the direction toward the belt tooth center line during engagement and the belt tooth is protected from chipping. Moreover, a behavior quantity of the belt tooth due to pitch errors becomes small since the deviation of the direction in which the compressive force applies from the belt tooth center line is little even when the belt is slipped out of position of the exact engagement with the pulley caused by the pitch errors. Therefore, durability of the belt can be increased and the noise level during engagement can be reduced.

In this case, when an arrangement of the belt tooth and the pulley groove is predetermined as in claim 7, it is more effective since the first contact point at which the belt tooth first contacts with the pulley groove is surely located at the groove bottom portion or the groove innermost portion of the pulley groove.

SPECIAL EMBODIMENT OF THE INVENTION

Figure 1:
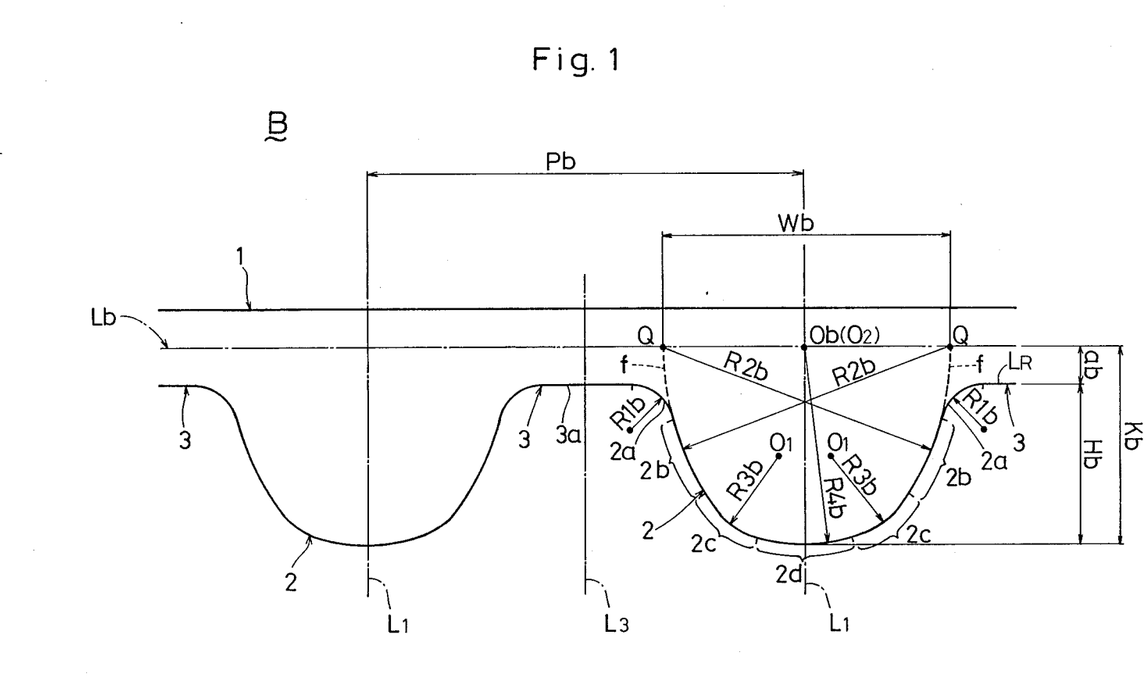
FIG. 1 is a fragmentary longitudinal side view of a toothed belt of this invention.

An embodiment of this invention is described below with reference to the drawings. As shown in FIG. 1, the toothed belt B has an endless belt body 1 made of elastomer material, in which at least one high elastic tensile member (not shown) which defines a belt pitch line Lb is embedded longitudinally extending along the belt pitch line Lb. On the inner periphery the belt body 1 has a plurality of same shaped belt teeth 2 formed at a certain pitch Pb and adapted for engaging in pulley grooves of the toothed pulley. The belt teeth 2 are separated by belt cavity portions 3 and each belt tooth 2 is symmetrical about a belt tooth center line $L_1$ in longitudinal cross-section. Each belt cavity portion 3 is also symmetrical about a belt cavity center line $L_3$ in longitudinal cross-section.

Each belt tooth 2 is divided into four regions in longitudinal cross-section from a tooth root to a tooth tip. Namely, each tooth 2 has a pair of opposed tooth root portions 2a occupying a first region, a pair of convex arcuate tooth flank portions 2b which extend from ends of tooth root portions 2a toward the tooth tip occupying a second region, a pair of convex arcuate tooth top portions 2c which extend from ends of tooth flank portions 2b toward the tooth tip occupying a third region, and a tooth tip portion 2d which connects ends of the tooth top portions 2c occupying a fourth region, and all these portions are connected so as to be formed in a continuous curvature.

Also, the belt tooth 2 has width Wb at tooth root measured between intersections Q and Q at which the belt pitch line Lb intersects imaginarily extended arcs f of each tooth flank portion 2b from conjunctive points thereof with each tooth root portion 2a toward the belt pitch line Lb. The width Wb at tooth root is predetermined to be in a range of 0.3–0.8 times as long as the belt tooth pitch line Pb.

The tooth root portion 2a of the belt tooth 2 is formed in a first circular arc with aa radius $R_2$ b connecting the tooth flank portion 2b to a base part 3a of the belt cavity portion 3 in both sides of the belt tooth center line $L_1$. The base part is a line coinciding with a belt land line LR which is colinear with base parts 3a of other belt cavity portions 3 on the belt B in longitudinal corss-section.

Further, the tooth has a tooth height Hb measured between an extremity of the tooth tip portion 2d and the belt land line L on the belt tooth center line $L_1$. The tooth height Hb is predetermined to be 1.02–1.20 times, preferably 1.01–1.10 times as high as a groove depth Hp of the pulley groove of the toothed pulley.

The tooth flank portion 2b is formed in a second circular arc with a radius $R_2$ b equal to the tooth root width Wb a center of which lies on the intersection Q between the belt pitch line Lb and the imaginarily extended arc f of the opposite tooth flank portion 2b from the belt tooth center line $L_1$.

The tooth tip portion 2d is formed in a fourth circular arc whose center $O_2$ lies on the belt tooth center line $L_1$ and whose radius $R_4$ b is predetermined to be in a range given by the inequality (1).

Moreover, the tooth top portion 2c is formed in a third circular arc whose center $O_1$ lies on a point n(x, y) apart from the belt tooth center line $L_1$ in the same side as the tooth top portion 2c. Concretely, the location of the point (x, y) is expressed by the equations n(2)–(6) in an x-y coordinate system composed of an origin on an intersection Ob between the belt pitch line 1B and the belt tooth center line $L_1$, x axis extending along the belt pitch line Lb in a direction toward the tooth top portion 2c in question from the belt tooth center line $L_1$ and y axis extending along the belt tooth center line $L_1$ in a direction toward the tooth top portion 2c from the belt pitch line Lb. Th eradius $R_3$ b is predetermined to be in a range given by the inequalities (7) and (8).

Figure 2:
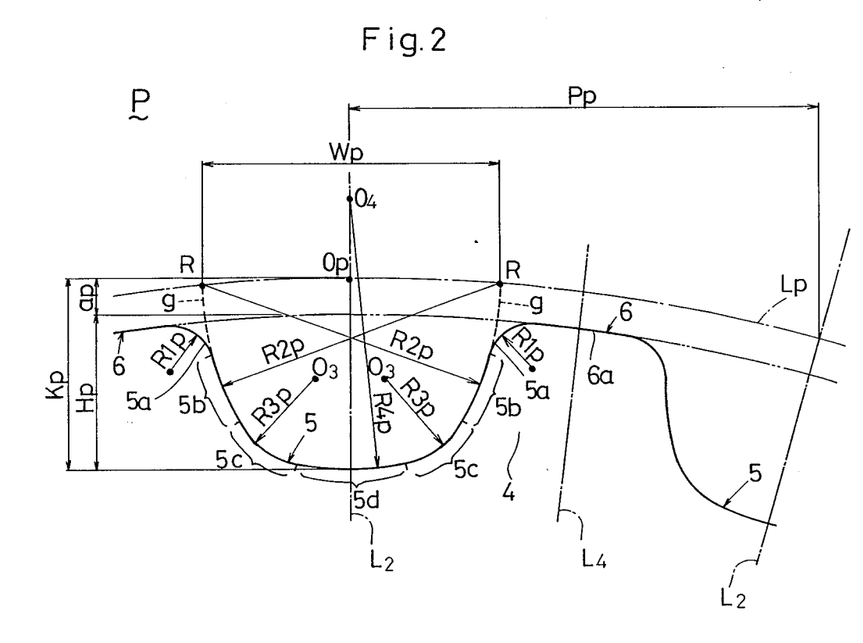
FIG. 2 is a fragmentary longitudinal side view of the toothed pulley of this invention.

On the other hand, the toothed pulley P has a plurality of pulley grooves 5 formed along an outer periphery of the pulley body 4 at a certain pitch Pp in which the belt teeth 2 of the toothed belt B engage under a compressed condition, as shown in FIG. 2. Pulley grooves 5 are separated by pulley tooth 6 and each pulley groove 5 is symmetrical about a pulley groove center line $L_2$ which intersects a center of the pulley in longitudinal crosssection. The pulley tooth 6 is also symmetrical about the pulley tooth center Line $L_4$ which intersects the center of the pulley in longitudinal cross-section.

Each pulley groove 5 is divided into four regions in longitudinal cross-section from a tooth root of the pulley tooth 6 to a groove bottom. Namely, the pulley groove 5 is composed of a pair of convex arcuate tooth root portions 5a which continue to the pulley tooth 6 occupying a first region, a pair of concaave arcuate groove flank portions 5b which extend from ends of root portions 5a toward the groove bottom occupying a second region, a pair of concave arcuate groove bottom portions 5c which extend from ends of the flank portions 5b toward the groove bottom occupying a third region, and a groove innermost portion 5d which connects ends of the groove bottom portions occupying a fourth region, and all these portions 5a–5d are connected so as to be formed in a continuous curvature.

The pulley groove 5 has a groove width Wp measured between intersections R and R at which the pulley pitch line Lp intersects imaginarily extended arcs g of pulley flank portions 5b from conjunctive points thereof with the tooth root portions 5a toward the pulley pitch line Lp. The groove width Wp is predetermined to be a sum of the width Wb at tooth root of the belt tooth 2 and a backlash quantity therebetween.

The tooth root portion 5a of the pulley groove 5 is formed in a first circular arc with a radius $R_1 p$ connecting the groove flank portion 5b to an outermost part 6a of the pulley tooth 6 in both sides of the pulley groove center line $L_2$. The outermost part 6a is a line coinciding with an outside diameter of the pulley whose center lies on a pulley center in longitudinal cross-section with other outermost parts 6a of the pulley tooth 6.

The groove flank portion 5b is formed in a second circular arc with a radius $R_2 p$ equal to the groove width Wp a center of which lies on the intersection R between the pulley pitch line Lp and the imaginarily extended arc of the opposite groove flank portion 5 from the pulley groove center line $L_2$.

The groove innermost portion 5d is formed in a fourth circular arc and whose center $O_4$ lies on the pulley groove center line $L_2$ and whose radidus $R_4 p$ is predetermined to be in a range given by a following inequality.

$$R_4 p \geq R_4 b$$

Each pulley groove has a groove height Hp measured on the pulley center line from an intersection between the outer periphery line and the pulley to an extremity of the innermost portion 5d.

Each groove bottom portion 5c is formed in a third circular arc whose center $O_3$ lies on a point (x, y) apart from the groove center line $L_2$ in the same side as the groove bottom portios 5c and whose radius $R_3 p$ is predetermined to be in a range given by the inequalities (16) and (17). Concretely, the location of the center $O_3$ of the groove bottom portion 5c is expressed by the equations (9)–(15) in an x-y coordinate system is composed of an origin on an intersection O between the pulley pitch line Lp and the pulley groove center line $L_2$, x axis extending along the pulley pitch line Lp in a direction toward the groove bottom portions 5c in question from the pulley groove center line $L_2$ and y axis extending along the pulley groove center line $L_2$ in an outward direction.

Wherein the pulley groove 5 of the toothed pulley P is preferably determined so as to satisfy following three expressions with respect to the belt tooth 2 of the toothed belt B.

$$Hb/Hp = 1.01 \sim 1.10$$

$$R_4 b \geq R_4 p$$

$$R_3 b > R_3 p$$

Figure 3:
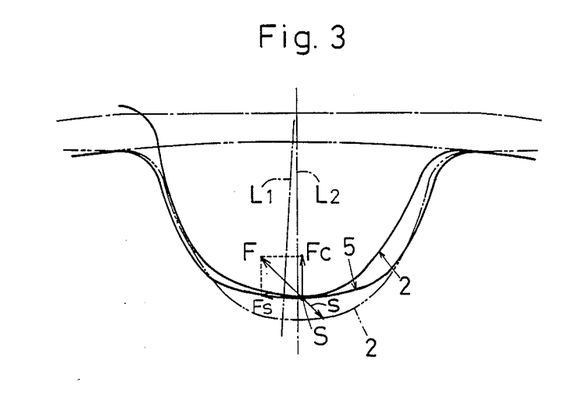
FIG. 3 is a fragmantary longitudinal side view of the pulley and belt when the first contact occurs.

Therefore, in the toothed belt B of the abovedescribed embodiment, as shown in FIG. 3, a first contact point S at which the belt tooth 2 of the toothed belt B first contacts with the pulley groove 5 of the toothed pulley P extremely approaches to the belt tooth center line $L_1$ and the pulley groove center line $L_2$ when the toothed belt B engages with the toothed pulley P, and lies almost on it. With reference to the components of a force F which applies to the belt tooth top during the period ranging from the first contact between the belt tooth 2 and the pulley groove 5 to the entire engagement therebetween, a shearing component Fs decreases and a compressive component Fc increases and concentrates toward the belt tooth center line $L_1$. In result, the fatigue of the belt tooth 2 is reduced.

Further, an angle of rotaation of the belt tooth 2 from the first contact with the pulley groove 5 to the entire engagement therewith is decreased to decrease a slip quantity s since the first contact point S approaches near the belt tooth center line $L_1$. Therefore, the fatigue of the belt tooth 2 can be more reduced and the noise becomes small.

As described above, in a power transmission device employing the toothed belt B and the toothed pulley P, durability of the belt B is improved and the noise level during engagement is decreased.

Figure 4:
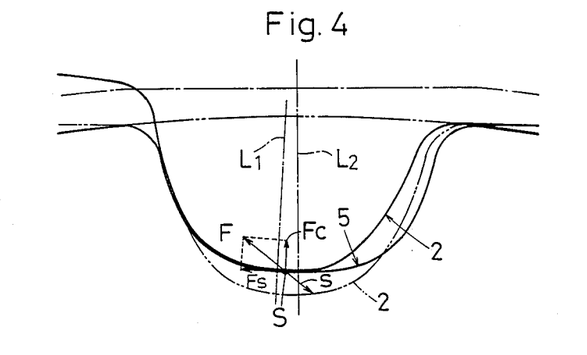
FIG. 4 is a fragmentary longitudinall side view of the pulley and belt when the first contact occurs in case plus pitch errors exist.
Figure 5:
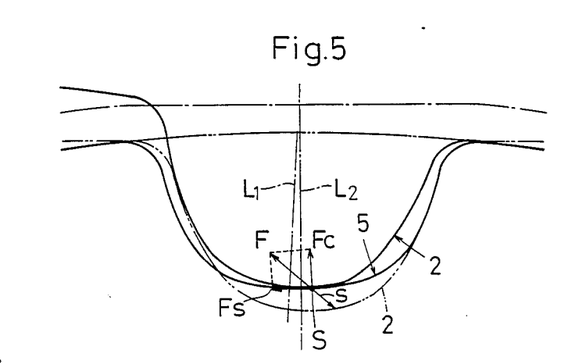
FIG. 5 is a fragmentary longitudinal side view of the pulley and belt when the first contact occurs in case minus pitch errors exist.

Moreover, since the centers of the groove bottom portion 5c and the groove innermost portion 5d of the pulley 5 are located in the same side as the pulley pitch line Lp from the groove innermost, the compressive force applied to the belt B concentrates toward a direction of the belt tooth center line $L_1$ during engagement to protect the belt tooth 2 from breaking. Further, even when the belt and the pulley are slipped out of position of the exact engagement caused by pitch errors in a plus value as shown in FIG. 4 or in a minus value as shown in FIG. 5, the behavior quantity of the belt tooth 2 is small since a deviation of the direction of the compressive force Fc from the direction of the belt tooth center line $L_1$ is small. Hence, durability of the belt B is improved and the noise level during engagement is further decreased.

A following table 1 shows the estimated results of a region and an angle of the first contact point S on the belt tooth 2 at which the belt tooth 2 of the toothed belt B first contacts with the pulley groove 5 of the toothed pulley P, varing a compressive quantity (-{(Hb-Hp)/Hp}X100%) and the radii $R_3 b$ and $R_3 p$, respectively. As shown in this table, a first contact point S preferably lies in the fourth region (groove innermost portion of the belt tooth) to lying in the third region (tooth top portion of the belt tooth) to improve durability and to decrease the noise because the first contact point S approaches nearer to the belt tooth center line $L_1$ and the pulley groove center line $L_2$.

TABLE 1

| Wp = 5.3 $R_4 p$ = 5.0 | Toothed Pulley | Toothed Belt | | | |
|---|---|---|---|---|---|
| | | $R_3 b$ = 0.5 | $R_3 b$ = 1.0 | $R_3 b$ = 1.8 | $R_3 b$ = 2.2 |
| Compressive Quantity = 0% | $R_3 p$ = 0.5 | | | | |
| | $R_3 p$ = 1.0 | | | | |
| | $R_3 p$ = 1.8 | | | 4th region 3° | 4th region 3° |
| | $R_3 p$ = 2.2 | | | 3rd region 4.5° | 3rd region 3.5° | 4th region 3° |

TABLE 1-continued

| Wp = 5.3 R4 p = 5.0 | Toothed Pulley | Toothed Belt | | | |
|---|---|---|---|---|---|
| | | R3 b = 0.5 | R3 b = 1.0 | R3 b = 1.8 | R3 b = 2.2 |
| Compressive | R3 p = 0.5 | | | | |
| Quantity | R3 p = 1.0 | 4th region 5° | 4th region 5° | 4th region 5° | |
| = | R3 p = 1.8 | 3rd region 5.5° | 4th region 5° | 4th region 5° | |
| 3.5% | R3 p = 2.2 | 3rd region 6° | 3rd region 6° | 3rd region 5° | |
| Compressive | R3 p = 0.5 | | | | |
| Quantity | R3 p = 1.0 | 4th region 7° | | | |
| = | R3 p = 1.8 | 3rd region 7° | 4th region 7° | 4th region 7° | |
| 7.8% | R3 p = 2.2 | 3rd region 8.5° | 3rd region 8° | 3rd region 7° | |
| Compressive | R3 p = 0.5 | | | | |
| Quantity | R3 p = 1.0 | 4th region 7.5° | | | |
| = | R3 p = 1.8 | 3rd region 8° | 4th region 7.5° | | |
| 10% | R3 p = 2.2 | 3rd region 9° | 3rd region 8.5° | | |
| Compressive | R3 p = 0.5 | | | | |
| Quantity | R3 p = 1.0 | | | | |
| = | R3 p = 1.8 | | | | |
| 20% | R3 p = 2.2 | | | | |

(unit; mm)

Figure 6:
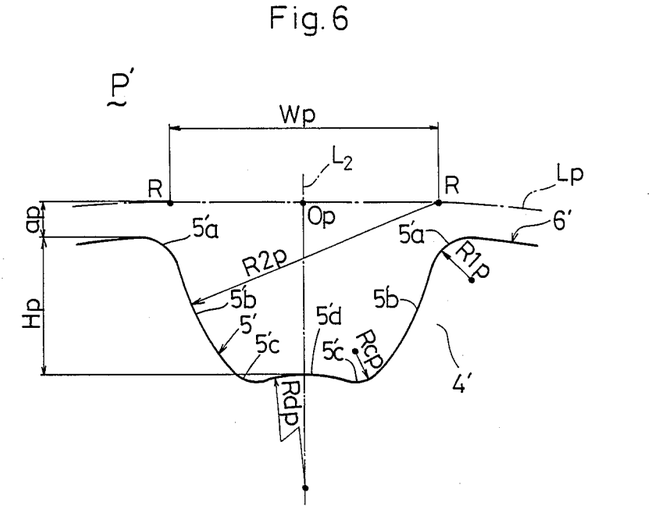
FIG. 6 is a longitudinal side view of another example of the toothed pulley.
Figure 7:
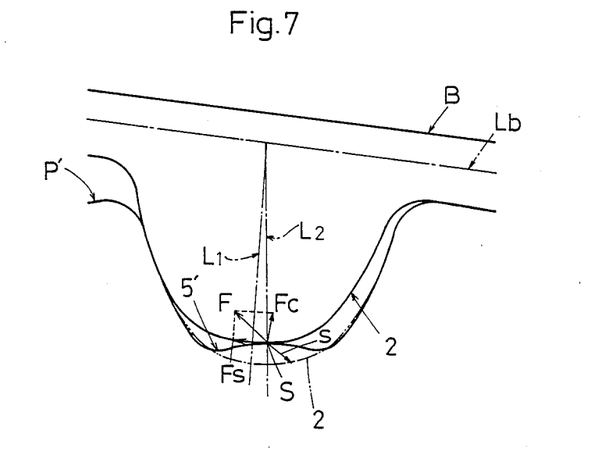
FIG. 7 is a fragmentary longitudinal side view showing an engaging condition of the toothed belt with the same pulley as shown in FIG. 6.

FIG. 6 shows the toothed pulley P' of another example (same toothed pulley as conventional one shown in FIG. 13), FIG. 7 shows an condition of the engagement between the toothed pulley P' and the toothed belt B shown in FIG. 1. The toothed pulley P' has a plurality of pulley grooves 5' along an outer periphery of a pulley body 4' at a certain pitch Pp in which the belt teeth 2 of the toothed belt B engage under the compressed condition. Pulley grooves 5' are separated by pulley teeth 6' and each pulley groove 5' is symmetrical about the pulley groove center line $L_2$ which intersects the pulley center in longitudinal cross-section. Also, each pulley tooth 6' is symmetrical about a pulley tooth center line $L_4$ which intersects the pulley center in longitudinal cross-section. The pulley groove 5' is substantially composed of a pair of circular arcs centers of which lie on the pulley pitch line Lp.

Concretely, each pulley 5' is divided into four regions in longitudinal corss-section from the tooth root to the groove bottom of the pulley tooth 6'. Namely, the pulley groove 5' is composed of a pair of convex arcuate tooth root portions 5'a which continue to the pulley tooth 6', a pair of concave arcuate groove flank portions 5'b which extend from ends of the tooth root portions 5'a toward the groove bottom, a convex arcuate base portion 5'd formed in a groove base, and a pair of concave arcuate conjunctive portions 5'c which connect the base portion 5'd with each flank portion 5'b. All these portions are connected so as to be formed in a continuous curvature.

The pulley 5' has a groove width Wp measured between the intersections R and R at which the pulley pitch line Lp intersects imaginarily extended arcs of the pulley flank portions 5'b from conjunctive points thereof with the tooth root portions 5'a. The groove width Wp is predetermined to be a sum of the width Wb at tooth root of the belt tooth and the backlash quantity c therebetween.

Each tooth root portion 5'a of the pulley groove 5' is formed in a circular arc with a radius $R_1 p$ connecting between the groove flank portion 5'b and an outermost part 6'a of the pulley tooth 6' in both sides of the pulley groove center line $L_2$. The groove flank portion 5'b is also formed in a circular arc with a radius $R_2 p$ equall to the groove width Wp a center of which lies on the intersection R between the pulley pitch line Lp and the imaginarily extended arc of the opposite groove flank portion 5'b, as same as the toothed pulley P shown in FIG. 2.

The groove innermost portion 5'd is formed in a circular arc with a radius Rdp a center of which lies on the pulley groove center line $L_2$. Concretely, the location of the center of the circular arc of the groove innermost portion 5'd is expressed by following equations in an x-y coordinate system which is composed of an origin on an intersection Op between the pulley pitch line Lp and the pulley groove center line $L_2$, x axis extending in a direction of the pulley pitch line Lp and y axis extending in an outward direction.

x = O y+ −Ap−Hp−Rdp

Wherein Rdp > O

Moreover, the conjunctive portion 5'c is formed in a circular arc which has a small radius Rcp and has a center apart from the pulley groove center line $L_2$ in the same side as the conjunctive portion 5'c from the pulley groove center line $L_2$. Concretely, the location of the center of the circular arc of the conjunctive portion 5'c is expressed by the following equations in an x-y coordinate system which is composed of an origin on the intersection Op between the pulley pitch line Lp and the pulley groove center line $L_2$, x axis extending in a direction toward the conjunctive portion 5'c in question from the pulley pitch line Lp and y axis extending in an outward direction of the pulley groove center line $L_2$.

$$x = -2A_2 \cdot B_2 \cdot \{2(1 + A_2^2)\}^{-1} + [4A_2^2 \cdot B_2^2 - 4(1 + A_2^2) \cdot \{B_2^2 - (Rdp - Rcp)^2\}]^{\frac{1}{2}} \cdot \{2(1 + A_2^2)\}^{-1}$$

$$y = x \cdot A_2 + B_2 - Hp - Rdp - ap$$

whererin

-continued $A_2 = -A_1/B_1$ $B_2 = \{-A_1^2 - (Rdp - Rcp)^2 - B_1^2 + (R_2p - Rcp)^2\}/(-2B_1)$ $A_1 = -Wp/2$ $B_1 = \{Od^2 - (Wp/2)^2\}^{\frac{1}{2}} - Od + Hp + Rdp + ap$ $Od = Pp \cdot N/(2\pi)$ (reference Pp is a pitch of the pulley groove)

Therefore, as shown in FIG. 7, in the toothed pulley P', the first contact point S approaches the belt tooth center line $L_1$ and the pulley groove center line $L_2$ when the belt B' engages with the pulley P' since the belt tooth 2 of the toothed belt B is formed in four circular arcs from 5a to 5d as described above. For this reason, the slip quantity s during the period from the first contact between the belt tooth 2 and the pulley groove 5' to the entire engagement therebetween under a compressed condition is decreased and the noise level decreases during engagement. Also, since the slip quantity s is small, the shearing force Fs applied to the belt tooth 2 during engagement is decreased and the compressive force Fc applied to the belt tooth 2 increases. Therefore, durability of the belt can be improved by these synergetic effects.

Figure 8:
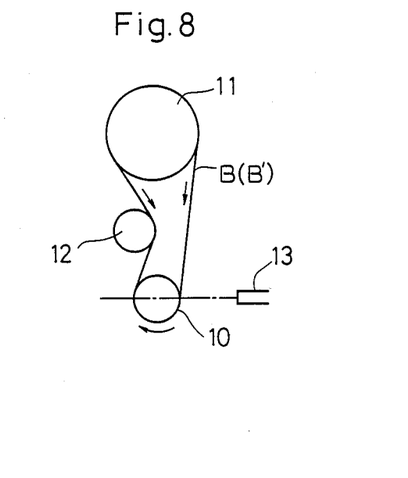
FIG. 8 is a schematic illustration of a test instrument for testing a noise level and a chip at a tooth root during engagement.
Figure 9:
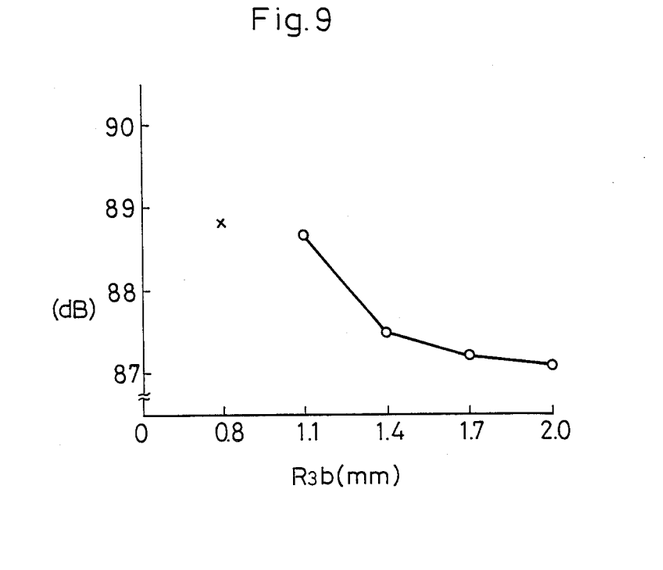
FIG. 9 is a graphical representation indicating the test result of the noise level test.

The test results of the noise level tests, the crack tests at the tooth roots, and teeth skip tests of the teeth during engagement between the toothed belt B and the toothed pulley P', as shown in FIG. 7, are described below. As shown in FIG. 8, the test instrument was composed of a driving pulley 10 having eighteen teeth, a driven pulley 11 having thirty-six teeth placed above the driving pulley 10, a back face tensioner 12 having 52 mm diameter placed therebetween and the toothed belt B in the present invention or a conventional type toothed belt B' trained therebetween. The noise level was detected by a microphone 13 placed at a distance 30 mm apart from the driving pulley 10 in the horizontal position when the driving pulley 10 was rotated at 1000 rpm under the condition of an air temperature 100° C. The test results are shown in FIG. 9. A variation of the property of the belt is also evaluated in accordance with four variations of the radius $R_3$ b of the third circular arc of the tooth top portion of the belt tooth within the range predetermined by the inequalities (7) and (8). The dimension of the portions of the belt is described in a table 2. The radius of the circular arc corresponding to the third circular arc is 0.8 mm in the conventional type.

TABLE 2

| Wb  | $R_1$ b | $R_2$ b | $R_4$ b | Pb    | belt width |
|-----|---------|---------|---------|-------|------------|
| 5.2 | 1.0     | 5.2     | 3.74    | 8.000 | 19         |

(unit: mm)

The time required until the crack at the tooth root of the belt is formed was measured in two cases where the transmittal load torque between both pulleys 10 and 11 are large and small. The test results are shown in a table 3.

TABLE 3

| Load | Example of this invention $R_3$ B (mm) | | | | conventional example |
|------|-----|-----|-----|-----|-----|
|      | 1.1 | 1.4 | 1.7 | 2.0 |     |
| 1.0 kgf · m | 115 | 126 | 139 | 147 | 110 |
| 0.5 kgf · m | 258 | 294 | 310 | 331 | 250 |

Regarding these test results, the belts in this invention display the superior properties to the conventional type belt in the noise level during engagement and in the time till the formation of the crack at the tooth root, and it is found the noise is reduced and durability is improved. The effective results are derived when the radius $R_3$ b of the third circular arc of the tooth top portion is predetermined within the range given by the inequalities (7) and (8). Especially, the larger the value of the radius $R_3$ b is predetermined, the more effective results are derived.

Figure 10:
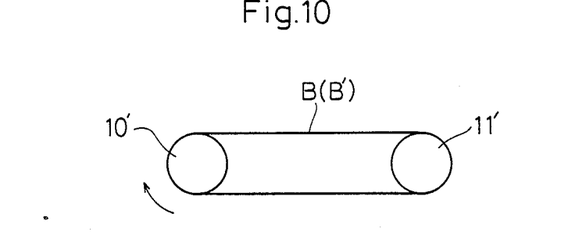
FIG. 10 is a schematic illustration showing an instrument for the tooth skip test.
Figure 11:
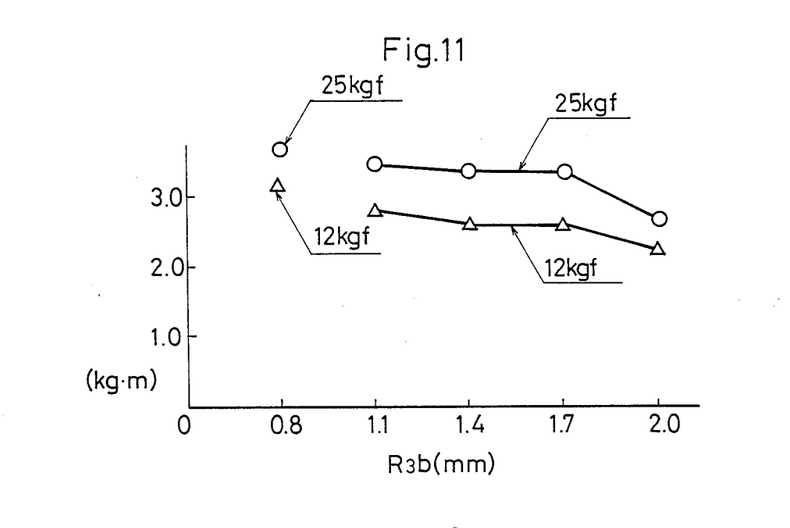
FIG. 11 is a graphical representation indicating the test result of the tooth skip test.

Also, as shown in FIG. 10, the tooth skip test was done under the condition where the pulley 10' and 11' are rotated at 100 rpm, and a tooth skip torque was measured. In this test, the toothed belt B in this invention or the conventional type belt B' is trained between the driving pulley 10' and driven pulley 11', both pulleys 10' and 11' having the twenty-four teeth, and tensions of both belts B and B' were vaaried in two values, 12 kgf and 25 kgf. The radius $R_3$ b of the third circular arc in this invention was varied in four types to compare with the conventional type belt (the radius of the circular arc equals 0.8 mm). The test results are shown in FIG. 11. As shown in FIG. 11, in the belt in this invention the tooth skip scarcely occurs than in the conventional type belt, especially, it is found that the larger the radius $R_3$ b of the third circular arc of the tooth top portion on the belt is, the lower the tooth skip torque is.

What is claimed is:

1. A toothed belt having an endless belt body made of elastomer material, tensile members embedded in said belt body extending longitudinally thereof along a belt pitch line and a plurality of teeth integrally formed with said belt body along an inner periphery thereof at a certain pitch Pb adapted for engaging with a toothed pulley in pulley grooves thereon;

said belt teeth being separated by belt cavity portions, each belt tooth being symmetrical about a belt tooth center line in longitudinal cross-section, each said belt cavity portion being symmetrical about a belt cavity portion center line in longitudinal cross-section;

each said belt tooth being divided into four regions in longitudinal cross-section from a tooth root to a tooth tip, a pair of opposed tooth root portions occupying a first region, a pair of convex arcuate tooth flank portions which extend from ends of said tooth root portions toward said tooth tip occupying a second region, a pair of convex arcuate tooth top portions which extend from ends of said tooth flank portions toward said tooth tip occupying a third region, and a tooth tip portion which connects ends of said tooth top portions occupying a fourth region, all said portions being connected so as to be formed in a continuous curvature;

each said belt tooth having a width Wb at tooth root measured between intersections Q and Q at which the belt pitch line intersects imaginarily extended arcs of said tooth flank portions from conjunctive points thereof with said tooth root portions in longitudinal cross-section, wherein the width Wb at tooth root is predetermined to be in a range of 0.3–0.8 times as long as the belt tooth pitch Pb;

each said tooth root portion of said belt tooth being formed in a first circular arc with a radius $R_1 b$ connecting said tooth flank portion to a base part of said belt cavity portion in both sides of the belt tooth center line, wherein said base part in longitudinal cross-section is a line coinciding with a belt land line which is colinear with base parts of other belt caavity portions on said belt;

each said tooth having a tooth height Hb measured between an extremity of said tooth tip portion and the belt land line on the belt tooth center line, wherein the tooth height Hb is predetermined to be higher than a groove depth dimension of said pulley groove;

each said tooth flank portion being formed in a second circular arc with a radius $R_2 b$ equal to the width Wb at tooth root whose center lies on the intersection Q between the belt pitch line and the imaginarily extended arc of the opposite tooth flank portion from the belt tooth center line;

said tooth tip portion being formed in a fourth circular arc whose center lies on the belt tooth center line and whose radius $R_4 b$ is predetermined to be in a range given by a following inequality, $$R_4 b > \{(Wb/2)^2 + Kb^2 - (R_2 b)^2\}/4 (Kb - R_2 b)$$

(wherein reference Kb is a distance measured between said extremity of said tooth tip portion and the belt pitch line.); and each said tooth top portion being formed in a third circular arc whose center lies on a point (x, y) apart from the belt tooth center line in the same side as said tooth top portions, the location of the point (x, y) being expressed by following equations in an x-y coordinate system which is composed of an origin on an intersection between the belt pitch line and the belt tooth center line, x axis extending along the belt pitch line in a direction toward said tooth top portions in question from the belt tooth center line and y axis extending along the belt tooth center line in a direction toward saidi tooth top portions from the belt pitch line, $$x = -(Wb/2) + (R_2b - R_3b)\cos\theta$$

$$y = (R_2b - R_3b)\sin\theta$$

wherein $$\theta = \sin^{-1}\{4T_A/(R_2b - R_3b) \cdot Wb\}$$

$$T_A = \{ T_S \cdot (T_S - R_2b + R_3b) \cdot (T_S - R_4b + R_3b) \cdot (T_S - Wb/2) \}^{\frac{1}{2}}$$

$$T_S = (R_2b + R_4b - 2R_3b + Wb/2)/2$$

and whose radius $R_3 b$ is predetermined to be in a range given by follwoing inequalities:

$$R_3b > \{(Wb/2)^2 + Kb^2 - (R_2b)^2\}/4(Kb - R_2b)$$

$$R_3b < \{(Wb/2)^2 + Kb^2 - (R_2b)^2\}/2(Kb - R_2b).$$

2. The toothed belt of claim 1, wherein the tooth height Hb of said belt tooth is predetermined to be in a range of 1.01–1.20 times as high as the depth dimension of said pulley groove.

3. A power transmission device composed of a toothed belt and a toothed pulley engaging therewith, said toothed belt having an endless belt body made of elastomer material, tensile members embedded in said belt body extending longitudinally thereof along a toothed belt pitch line and a plurality of teeth integrally formed with said belt body along an inner periphery thereof at a certain pitch Pb adapted for engaging with said toothed pulley in pulley grooves thereon;

said belt teeth being separated by belt cavity portions, each belt tooth being symmetrical about a belt tooth center line in longitudinal cross-section, each said belt cavity portion being symmetrical about a belt cavity center line in longitudinal cross-section;

each said tooth being divided into four regions in longitudinal cross-section from a tooth root to a tooth tip, a pair of opposed tooth root portions occupying a first region, a pair of convex arcuate tooth flank portions which extend from ends of said root portions toward said tooth tip occupying a second region, a pair of convex arcuate tooth top portions which extend from ends of said flank portions toward said tooth tip occupying a third region, and a tooth tip portion which connects ends of said tooth top portions occupying a fourth region, all said portions being connected so as to be formed in a continuous curvature;

each said belt tooth having a width Wb at tooth root measured between intersections Q and Q at which the belt pitch line intersects imaginarily extended arcs of said tooth flank portions from conjunctive points thereof with said tooth root portions in longitudinal cross-section, wherein the width Wb at tooth root is predetermined to be in a range of 0.3–0.8 times as long as the belt tooth pitch Pb;

each said tooth root portion of said belt tooth being formed in a first circular arc with a radius $R_1 b$ connecting said tooth flank portion to a base part of said belt cavity portion in both sides of the belt tooth center line, wherein said base part in longitudinal cross-section is a line coinciding with a belt land line which is colinear with base parts of other belt cavity portions on side belt;

each said tooth having a toth height Hb measured between an extremity of said tooth tip portion and the belt land line on the belt tooth center line, wherein the tooth height Hb is predetermined to be higher than a groove depth dimension of said pulley groove;

each said tooth flank portion being formed in a second circular are with a radius $R_2 b$ equal to the width Wb at tooth root whose center lies on the intersection Q between the belt pitch line and the imaginary extended arc of the opposite tooth flank portion from the belt tooth center line;

said tooth tip portion being formed in a fourth circular arc whose center lies on the belt tooth center line and whose radius $R_4 b$ is predetermined to be in a range given by a following inequality, $$R_4 b > \{(Wb/2)^2 + Kb^2 - (R_2 b)^2\}/4 (Kb - R_2 b)$$

(wherein reference Kb is a distance measured between said extremity of said tooth tip portion and the belt pitch line); and each said tooth top portion being formed in a third circular arc whose center lies on a point (x, y) apart from the belt tooth center line in the same side as said tooth top portions, the location of the point (x, y) being expressed by following equations in an x-y coordinate system which is composed of an origin on an intersection between the belt pitch line and the belt tooth center line, x axis extending along the belt pitch line in a direction toward said tooth top portions in question from the belt tooth center line and y axis extending along the belt tooth center line in a direction toward said tooth top portions from the belt pitch line, $$x = -(Wb/2) + (R_2b - R_3b)\cos\theta$$

$$y = (R_2b - R_3b)\sin\theta$$

wherein $$\theta = \sin^{-1}\{4T_A/(R_2b - R_3b) \cdot Wb\}$$

$$T_A = \{T_S \cdot (T_S - R_2b + R_3b) \cdot (T_S - R_4b + R_3b) \cdot (T_S - Wb/2)\}^{\frac{1}{2}}$$

$$T_S = (R_2b + R_4b - 2R_3b + Wb/2)/2$$

and whose radius $R_3$ b is predetermined to be in a range given by follwoing inequalities:

$$R_3b > \{(Wb/2)^2 + Kb^2 - (R_2b)^2\}/4(Kb - R_2b)$$

$$R_3b < \{(Wb/2)^2 + Kb^2 - (R_2b)^2\}/2(Kb - R_2b)$$

each said toothed pulley having a plurality of pulley grooves formed along an outer periphery thereof at a certain pitch Pp in which said belt teeth of said toothed belt engage under a compressed condition;
said pulley grooves being separated by pulley teeth, each said pulley groove being symmetrical about a pulley groove center line in longiudinal cross-section, each said pulley tooth being symmetricall about a pulley tooth center line in longitudinal cross-section; and
each said pulley groove being substantially composed of a pair of circular arcs whose centers lie on the pulley pitch line.

4. The power transmission device of claim 3, wherein the tooth height dimension of said belt tooth is predetermined within a range of 1.01–1.20 times as high as a groove depth dimension of said pulley groove.

5. A power transmission device composed of a toothed belt and toothed pulley engaging therwith, said toothed belt having an endless belt body made of elastomer material, tensile members embedded in said belt body extending longitudinally thereof along a belt pitch line and a plurality of teeth integrally formed with said belt body along an inner periphery thereof at a certain pitch Pb adapted for engaging with said toothed pulley in pulley grooves thereon;
said belt teeth being separated by belt cavity portions, each belt tooth being symmetrical about a belt tooth center line in longitudinal cross-section, each said belt cavity portion being symmetrical about a belt cavity portion center line in longitudinal cross-section;
each said tooth being divided into four regions in longitudinal cross-section from a tooth root to a tooth tip, a pair of opposed tooth root portions occupying a first region, a pair of convex arcuate tooth flank portions which extend from ends of said root portions toward said tooth tip ocoocupying a second region, a pair of convex arcuate tooth top portions which extend from ends of said flank portions toward said tooth tip occupying a third region, and a tooth tip portion which connects ends of said tooth top portions occupying a fourth region, all said portions being connected so as to be formed in a continuous curvature;
each said belt tooth having a width Wb at tooth root measured between intersections Q and Q at which the belt pitch line intersects imaginarily extended arcs of said tooth flank portions from conjunctive points thereof with said tooth root portions in longitudinal cross-section, wherein the width Wb at tooth root is predetermined to be in a range of 0.3–0.8 times as long as the belt tooth pitch Pb;
each said tooth root portion of said belt tooth being formed in a first circular arc with a radius $R_1$ b connecting said tooth flank portion to a base part of said belt cavity portion in both sides of the belt tooth center line, wherein said base part in longitudinal cross-section is a line coinciding with a belt land line which is colinear with base parts of other belt cavity portions on said belt;
each said tooth having a tooth height Hb measured between an extremity of said tooth tip portion and the belt land line on the belt tooth center line, wherein the tooth height Hb is predetermined to be higher than a groove depth dimension of said pulley groove;
each said tooth flank portion being formed in a second circular arc with a radius $R_2$ b equal to the width Wb at tooth root whose center lies on the intersection Q between the belt pitch line and the imaginarily extended arc of the opposite tooth flank portion from the belt tooth center line;
said tooth tip portion being formed in a fourth circular arc whose center lies on the belt tooth center line and whose radius $R_4$ b is predetermined to be in a range given by a following inequality, $$R_4 b > \{(Wb/2)^2\}/4 (Kb - R_2 b)$$

(wherein reference Kb is a distance measured between said extremity of said tooth tip portion and the belt pitch line); and
each said tooth top portion being formed in a third circular arc whose center lies on a point (x, y) apart from the belt tooth center line in the same side as said tooth top portions, the location of the point (x, y) being expressed by following equations in an x-y coordinate system which is composed of an origin on an intersection between the belt pitch line and the belt tooth center line, x axis extending along the belt pitch line in a direction toward said tooth top portions in question from the belt tooth center line and y axis extending along the belt tooth center line in a direction toward said tooth top portions from the belt pitch line, $$x = -(Wb/2) + (R_2b - R_3b)\cos\theta$$

$$y = (R_2b - R_3b)\sin\theta$$

wherein $$\theta = \sin^{-1}\{4T_A/(R_2b - R_3b) \cdot Wb\}$$

-continued $$T_A = \{ T_S \cdot (T_S - R_2b + R_3b) \cdot (T_S - R_4b + R_3b) \cdot (T_S - W_b/2) \}^{\frac{1}{2}}$$

$$T_S = (R_2b + R_4b - 2R_3b + W_b/2)/2$$

and whose radius $R_3b$ is predetermined to be in a range given by follwoiing inequalities:

$$R_3b > \{(W_b/2)^2 + K_b^2 - (R_2b)^2\}/4(K_b - R_2b)$$

$$R_3b < \{(W_b/2)^2 + K_b^2 - (R_2b)^2\}/2(K_b - R_2b)$$

each said toothed pulley having a plurality of pulley grooves formed along an outer periphery thereof at a certain pitch Pp in which said belt teeth of said toothed belt engage under a compressed condition;

said pulley grooves being separated by pulley teeth, each said pulley groove being symmetrical about the pulley groove center line in longitudinal cross-section, each said pulley tooth being symmetrical about the pulley tooth center line in longitudinal cross-section;

each said pulley groove being substantially composed of a pair of circular arcs whose centers lie on the pulley pitch line;

each said pulley groove being divided into four regions in longitudinal cross-section from a tooth root to a groove bottom, composed of a pair of tooth root portions which continue to said pulley tooth occupying a first region, a pair of concave arcuate groove flank portions which extend from ends of said tooth root portions toward said groove bottom occupying a second region, a pair of concave arcuate groove bottom portions which extend from ends of said groove flank portions toward the groove bottom occupying a third region, and a groove innermost portion which connects ends of said groove bottom portions occupying a fourth region, all said portions being connected so as to be formed in a continuous curvature;

each said pulley groove having a groove width Wp measured between intersectiones R and R at which the pulley pitch line intersets imaginarily extended arcs of said pulley flank poirtions from conjunctive points thereof with said tooth root portions in longitudinal cross-section, wherein the groove width Wp is predetermined to be a sum of the width Wb at tooth root of said belt tooth and a backlash quantity c therebetween;

each said tooth root portion of said pulley groove being formed in a first circular arc with a radius $R_1p$ connecting said groove flank portion to an outermost part of said pulley tooth in both sides of the pulley groove center line, wherein said outermost part in longitudinal cross-section is a line coinciding with an outside diameter of said pulley whose center lies on a pulley center with other outermost parts of the pulley tooth;

each said groove flank portion being formed in a second circular arc with a radius $R_2p$ equal to the groove width Wp whose center lies on the maginarily extended arc of the opposite groove flank portion from the pulley center line;

each said groove innermost portion being formed in a fourth circular arc whose center lies on the pulley groove center line, and whose radius $R_4p$ is predetermined to be in a range given by a following inequality $$R_4p \geqq R_4b;$$

each said pulley groove having a groove height Hp measured on the pulley center line from an intersection between the outer periphery line and said pulley to the extremity of said innermost portion; and each said groove bottom portion being formed in a third circular arc whose center lies on a point (x, y) apart from the pulley groove center line in the same side as said groove bottom portions, the location of the point (x, y) being expressed by following equations in an x-y coordinate system which is composed of an origin on an intersection between the pulley pitch line and the pulley groove center line, x axis extending along the pulley pitch line in a direction toward said groove bottom portions in question from the pulley groove center line and y axis extending along the pulley groove center line in an outward direction, $$x = -2A_2 \cdot B_2 \cdot \{2(1 + A_2^2)\}^{-1} + \{4A_2^2 \cdot B_2^2 - 4(1 + A_2^2) \cdot \{B_2^2 - (R_3p - R_4p)^2\}]^{\frac{1}{2}} \cdot \{2(1 + A_2^2)\}^{-1}$$

$$y = X \cdot A_2 + B_2 - Hp + R_4p - ap$$

wherein $$A_2 = -A_1/B_1$$

$$B_2 = \{-A_1^2 - (R_3p - R_4p)^2 - B_1^2 + (R_2p - R_3p)^2\}/(-2B_1)$$

$$A_1 = -Wp/2$$

$$B_1 = \{Od^2 - (Wp/2)^2\}^{\frac{1}{2}} - Od + Hp - R_4p + ap$$

$$Od = Pp \cdot N/(2\pi)$$

(reference ap being a differential quantity of the pulley pitch line of said pulley, reference N being numbers of said pulley teeth)

and whose radius $R_3p$ is predetermined to be in a range given by following inequalities:

$$R_3p > \{(Wp/2)^2 + K_p^2 - (R_2p)^2\}/4(K_p - R_2p)$$

$$R_3p < \{(Wp/2)^2 + K_p^2 - (R_2p)^2\}/2(K_p - R_2p)$$

(wherein reference Kp is a distance dimension measured between an extremity of said innermost portion of said pulley groove and the pulley pitch line).

6. The power transmission device of claim 5, wherein the tooth height Hb of said belt is predetermined to be in a range of 1.01–1.20 times as high as a groove depth Hp of said pulley groove.

7. The power transmission device of claim 5, wherein a shape of said belt tooth and a shape of said pulley groove are predetermined to satisfy a following equation and inequalities:

$$Hb/Hp = 1.01 \sim 1.10$$

$$R_4b \leqq R_4p$$

$$R_2b > R_3p.$$

8. The power transmission device of claim 6, wherein a shape of said belt tooth and a shape of said pulley groove are predetermined to satisfy a following equation and inequalities:

$$Hb/Hp = 1.01 \sim 1.10$$

$$R_4b \leq R_4p$$

$$R_3b > R_3p.$$

* * * * *